J. C. Richardson.
Ironing Hats.
Nº 85,904. Patented Jan. 19, 1869.

Witnesses.
J. W. C. Dey.
C. C. Livings.

Inventor.
John C. Richardson.

JOHN C. RICHARDSON, OF NEWARK, NEW JERSEY.

Letters Patent No. 85,964, dated January 19, 1869.

IMPROVEMENT IN HAT-FINISHING MACHINES.

The Schedule referred to in these Letters Patent and making part of the same.

*To all whom it may concern:*

Be it known that I, JOHN C. RICHARDSON, of Newark, in the county of Essex, and State of New Jersey, have invented certain new and useful Improvements in Hat-Finishing or Hat-Ironing Machines; and I do hereby declare that the following is a full and exact description thereof.

My invention relates to means for keeping the hat-block cool while the plate is kept at the proper working-temperature. The high temperature required in that part of the plate in contact with the brim, in order to properly finish that portion of the hat, ordinarily communicates so much heat to the centre and to the hat-block as to cause serious inconvenience. The hat-blocks, if made of wood, are warped and destroyed rapidly, and, whether of wood or metal, are painful to handle.

I will proceed to describe what I consider the best means of carrying out my invention, and will afterward designate the point which I believe to be new.

The accompanying drawings form a part of this specification.

Figure 1:
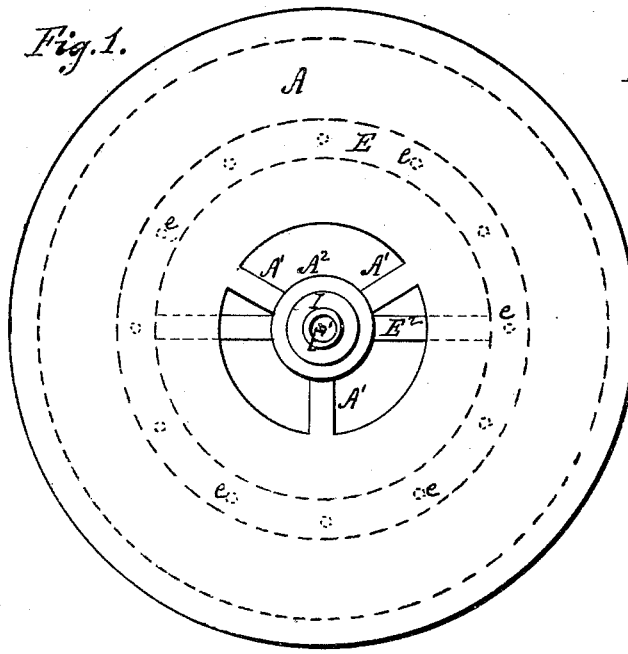
Figure 2:
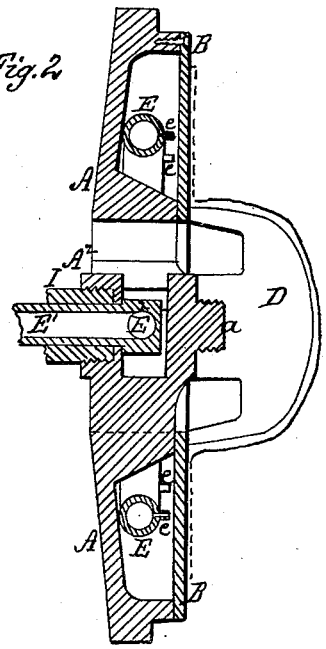
Figure 3:
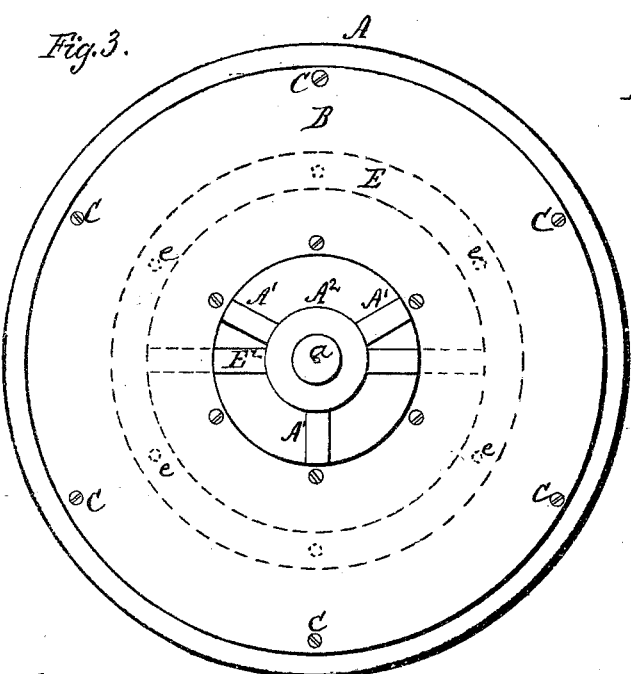
Figure 4:
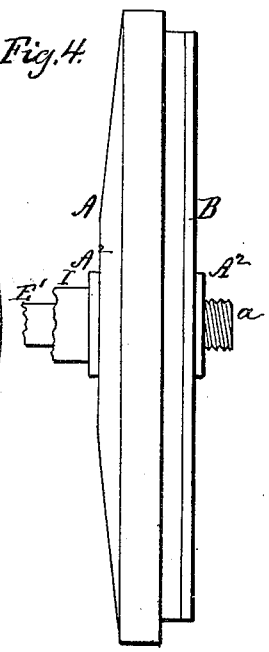

Figure 1 is a view of the rear face of the plate.
Figure 2 is a cross-section.
Figure 3 is a view of the front face, and
Figure 4 is an edge view.

Similar letters of reference indicate like parts in all the figures.

Tints are employed merely to aid in distinguishing the parts, and do not necessarily imply differences of material.

The material of the whole may be iron.

The drawings represent the novel parts. Their relations to the other parts are readily intelligible from the description.

A and B are two pieces of iron, which, when screwed firmly together by the screws C, or other suitable means, form the plate or revolving part, against which the brim of the hat is held in being finished.

The hat-block D is secured to the plate by means of the stout screw $a$, fixed in the latter, as usual.

I prefer to provide my plate with gearing on the periphery, matching the teeth of a driving-wheel, not represented, and thereby communicating the proper rotatory motion to the plate and to the hat-block and hat. I also prefer to mount, at the rear or back of the plate, a pulley, not represented, which, by means of a suitable belt and other connections, imparts a more rapid motion to the plate and its adjuncts at a certain period, to pounce or otherwise treat the hat, all as described in a patent issued to myself and G. W. Stout, dated December 3, 1867. But all these details are not absolutely essential to the success of my present invention. I believe that it may be applied with any approved form or arrangement of the other parts of the machine.

In the hollow space, between the parts A and B, is a ring, E, having suitable orifices or burners, $e$, for jets of gas, the gas being supplied to the ring E through the connections $E^1 E^3$, as represented. This apparatus supplies the gas for heating the plate, holes, not represented, being provided, through which to ignite and supply air to the jets.

The gas is supplied to the pipe $E^2$ through the street-main, or other suitable sources, by means of suitable couplings and connections, as usual.

The parts above referred to have been before known, but in the previous constructions, the plate has been solid, and the heat communicated by the gas-jets to the plate, at the part where the brim is being ironed, was conducted inward through the middle and communicated to the block D. My invention reduces this evil by hollowing out the central portion of the plate under the block, and by allowing cool air to circulate freely therein.

I have represented this hole or hollow in the drawings as a trifle smaller than the hat-block. The size may vary within wide limits without entirely defeating the object of my invention. But it is better that the hole shall be as near the size of the block as is practicable, while still allowing the block to lap over a little upon the solid material of the plate.

The several sizes of blocks may be used with one plate without serious inconvenience. The largest block, in such cases, will, of course, lap more upon the metal than the smallest.

In all cases, the plate communicates heat to the block somewhat in proportion to the surface which is in contact therewith, and the heat is removed or carried away from the interior of the plate and from the under surface of the block, (or, in other words, the parts are cooled,) somewhat in proportion to the size of the hole, and the facility or rapidity with which cool air is circulated therein.

A strong and reliable connection is made between the plates A and B with the screw $a$ and with the shaft I, on which the whole is mounted, by means of radial arms, $A^1$, extending inward from the part A, and joining in a stout hub, $A^2$, which hub is adapted to accommodate the gas-connections $E^1 E^2$, as represented.

These arms $A^1$ are flat and thin, and afford ample strength without communicating any considerable quantity of heat to the hub and screw.

Metallic connections may be omitted altogether at this part, if preferred, and gutta-percha or any other good non-conductor may be substituted, in case it shall be found expedient to still further suppress the communication of heat, but I do not consider it ordinarily necessary.

Many modes may be adopted for constructing and connecting the several details. I have represented that which I consider the best for ordinary practice.

The gas-circle E is made in two pieces, each piece connected at each end by coupling rings to T-pieces on the ends of the connections $E^1$, and these connections $E^1$ are screwed in a T-piece, connecting them with the central or axial connection $E^2$ in the interior of the hub.

The irons, brushing-devices, or other finishing-appliances, may be constructed and applied to the hat, and the blocks may be of any form and of any material which may be found most desirable in practice. I prefer, for some reasons, to employ metallic forms or hat-blocks, making them hollow at the back, both for lightness and coolness. The hollow interior of the blocks, in such case, will receive the circulation of air through the hollow interior of the plate.

Having now fully described my invention,

What I claim as new therein, and desire to secure by Letters Patent, is as follows:

I claim the brim-plate, provided with an opening communicating with the cone-block, adapted to isolate or partially isolate the heated portion from the cone-block, so as to retard the communication of heat thereto, substantially as and for the purposes herein set forth.

In testimony whereof, I have hereunto set my name, in presence of two subscribing witnesses.

JOHN C. RICHARDSON.

Witnesses:
THOMAS D. STETSON,
W. C. DEY.